(12) United States Patent
Scott

(10) Patent No.: US 9,915,729 B2
(45) Date of Patent: Mar. 13, 2018

(54) APPARATUS AND METHOD FOR HIGH SPEED SUBSURFACE INSPECTION OF BUILT INFRASTRUCTURE

(71) Applicant: Michael Leon Scott, Kensington, MD (US)

(72) Inventor: Michael Leon Scott, Kensington, MD (US)

( * ) Notice: Subject to any disclaimer, the term of this patent is extended or adjusted under 35 U.S.C. 154(b) by 403 days.

(21) Appl. No.: 14/805,543

(22) Filed: Jul. 22, 2015

(65) Prior Publication Data

US 2017/0023671 A1 Jan. 26, 2017

(51) Int. Cl.
*G01S 13/88* (2006.01)
*G01S 7/02* (2006.01)

(52) U.S. Cl.
CPC ....... *G01S 13/885* (2013.01); *G01S 2007/027* (2013.01)

(58) Field of Classification Search
CPC .......................... G01S 13/885; G01S 2007/027
USPC ........................................................ 342/22
See application file for complete search history.

(56) References Cited

U.S. PATENT DOCUMENTS

| | | | |
|---|---|---|---|
| 9,739,574 B1* | 8/2017 | Vijay | F41H 11/18 |
| 2009/0037049 A1* | 2/2009 | Clodfelter | A01B 63/00 701/36 |
| 2015/0362422 A1* | 12/2015 | Mazzeo | G01N 27/20 324/238 |

* cited by examiner

*Primary Examiner* — Timothy A Brainard
(74) *Attorney, Agent, or Firm* — H. Jay Spiegel

(57) ABSTRACT

A ground penetrating radar antenna array is consistently maintained at a spacing of less than or equal to about 4 inches above the target surface. As a result, the antenna array may be moved up to 75 mph while maintaining accuracy of data collection. The apparatus includes a wooden support from which non-elastic straps are suspended. The straps are attached to a housing containing the ground penetrating radar antenna array and receiver. The housing is supported from below by a pair of skis that have wear plates attached to their undersides with the wear plates engaging the target surface. The wear plates maintain the distal ends of the antennas within the antenna array at a spacing from the target surface of less than or equal to 4 inches, preferably 3.75±0.25 inches. The method of operation is also disclosed.

18 Claims, 4 Drawing Sheets

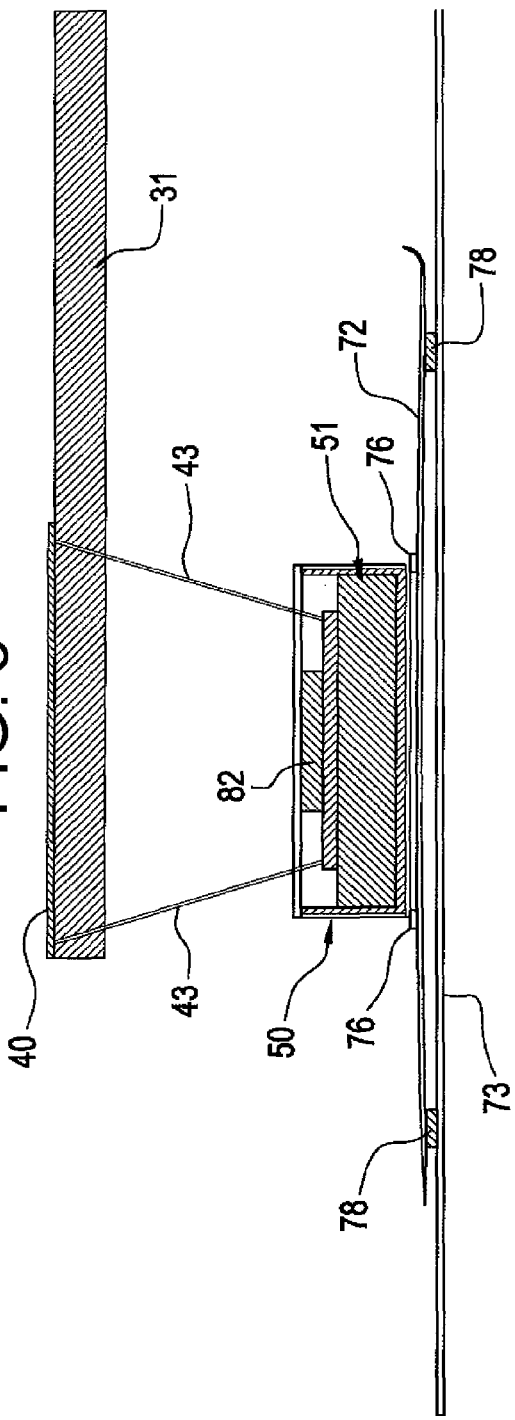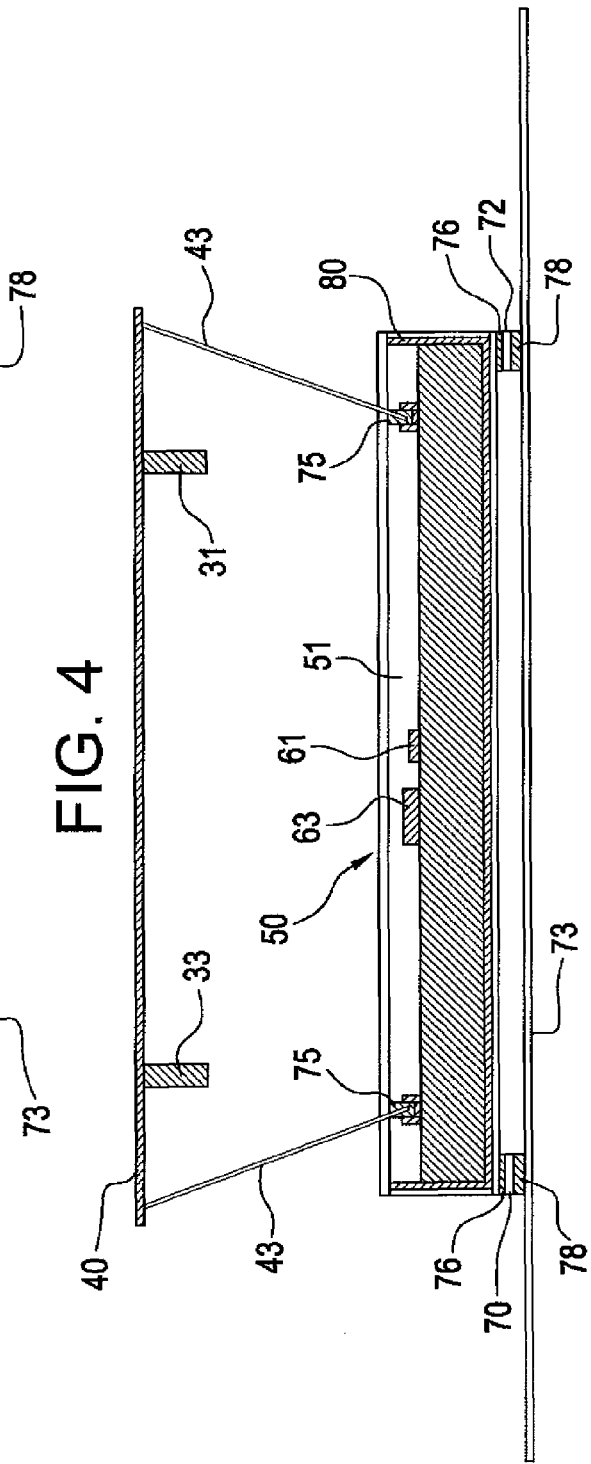

APPARATUS AND METHOD FOR HIGH SPEED SUBSURFACE INSPECTION OF BUILT INFRASTRUCTURE

BACKGROUND OF THE INVENTION

The present invention relates to an apparatus and method for high speed subsurface inspection of built infrastructure. Presently, a large proportion of transportation civil infrastructure is approaching or exceeding its original design service life (as many United States interstate highways were built in the 1950s with a fifty year design life). In addition, building infrastructure can often become deficient and/or structurally challenged as structure needs evolve, aging processes occur, and material deterioration progresses. Current state of the practice methods (such as visual inspection) are extremely difficult, time-consuming, and expensive. They are inadequate for tasks including evaluating highways, bridges, and other civil structures. These state of the practice methods are inconsistent and do not quantify issues and requirements for optimum repair, rehabilitation, or replacement decisions by civil infrastructure asset owners. Many civil structures are made of poured concrete reinforced with rebar and other concrete and steel configurations (such as post-tensioned/prestressed concrete). Steel reinforcement is often embedded within the concrete, where corrosion related deterioration is a common occurrence in many parts of the world. Steel corrosion products occupy more volume than the original steel. Therefore, corrosion increases internal material stress (which frequently leads to concrete cracking and concrete delaminations). Subsurface evaluation of civil infrastructure component condition (such as a bridge deck) and detection of subsurface deterioration at an early stage can inform and encourage maintenance, rehabilitation, or replacement decisions. Skyscrapers are designed to flex to at least a small degree to accommodate to wind, heat fluctuations, and other ambient conditions. Upon construction, Quality Control/Quality Assurance (QC/QA) parameters such as concrete cover depth (from the concrete surface to the depth of the top mat of steel reinforcement can be evaluated to predict corrosion processes (where oxygen and chlorides must diffuse down to the level of steel reinforcement). Design of buildings and other structures to accommodate to ambient conditions requires complete and accurate inspection of those structures to ensure that they remain safe for use. The same is equally true of roadways and bridges which are typically configured with reinforcement or prestressed steel strands within ducts or other structures allowing them to flex, twist, expand, and contract in a reversible fashion to accommodate to ambient conditions and leading to ensure long useful life.

Over the years, several techniques have evolved to facilitate inspection of structures, buildings, roadways, and bridges. Among those techniques, most pertinent to the teachings of the present invention is the use of ground penetrating radar technology, a technology that permits inspection of structures, roadways, and bridges to determine whether reinforcing aspects embedded beneath the surface are corroded, causing material cracking or delamination cracking due to internal stresses, in need of replacement, or otherwise of concern.

While use of ground penetrating radar is an effective way to perform non-invasive inspections, in currently used ground penetrating radar inspection systems, their major impediments are that they are time-consuming and expensive to apply. To date, no one has developed a ground penetrating radar-based inspection system that can efficiently and accurately perform such inspections at high speed in a close coupled configuration. For example, on roadways and bridges, present day close coupled or ground coupled ground penetrating radar-based systems can only move at a speed below 10 mph while performing accurate evaluations, thereby causing such inspections to be extremely time-consuming. Moreover, at such speeds, the inspection vehicle bearing the inspection system impedes traffic as it works. An inspection vehicle traveling at less than 10 mph takes up an entire lane of traffic or more and will back up traffic for miles under circumstances when inspections are being undertaken during peak use times.

As such, a need has developed for a ground penetrating radar-based inspection system which can perform inspections in such a way as to not impede traffic during the process. Ideally, a system that could move at typical highway speeds or even at higher speeds would be a significant enhancement since inspections could be conducted efficiently, less expensively, and without in any way impeding traffic. It is with these goals in mind that the present invention was developed.

Applicant is aware of the following prior art:

U.S. Pat. No. 5,680,048 to Wollny teaches a handheld device using ground penetrating radar to detect metallic objects that are beneath the ground surface. Wollny fails to teach a device that is able to move quite rapidly to inspect roadways, bridges, structures, and other infrastructure.

U.S. Pat. No. 5,835,053 to Davis discloses a roadway ground penetrating radar system to generate a continuous profile of pavement structure. Davis fails to disclose the spacing between the ground penetrating radar transmitter and the roadway in question nor does Davis teach or suggest the speed of movement of the system with respect to the roadway in question.

U.S. Pat. No. 5,835,054 to Warhus et al. discloses an ultra wideband ground penetrating radar imaging of heterogeneous solids. Warhus et al. fail to teach or suggest spacing between the radar transmitter and the structure being examined nor do they teach or suggest high speed examination of such structures nor any speed of inspection for that matter.

U.S. Pat. No. 6,388,629 to Albats, Jr. et al. discloses a rotating scanning antenna apparatus and method for locating buried objects. The Albats, Jr. et al. device teaches rotation of a sensor as opposed to linear movement thereof. The patent also does not teach or suggest any speed of propagation along an object being examined.

U.S. Pat. No. 6,496,137 to Johansson teaches a ground penetrating radar array and timing circuit. This patent teaches the use of ground penetrating radar and includes a housing on wheels allowing the system to be moved. However, this patent does not teach or suggest any speed of movement thereof nor is there any teaching or suggestion of a desired spacing between the transmitter and the surface being examined.

U.S. Pat. No. 8,174,429 to Steinway et al. discloses a mine detection device. The device includes use of ground penetrating radar to detect subsurface objects. However, the only disclosure of speed of movement describes one implementation as moving the search device between 1 to 3.6 feet per second across a 5 foot lane. This is extremely slow operation indeed.

SUMMARY OF THE INVENTION

The present invention relates to an apparatus and method for high speed subsurface inspection of built infrastructure. The present invention includes the following interrelated objects, aspects and features:

(1) In a first aspect, Applicant has discovered through lengthy and extensive experimentation that by maintaining the distal ends of a ground penetrating radar antenna array consistently less than or equal to 4 inches of clearance from a target surface, the inventive device provides enhanced signal quality, enhanced resolution, enhanced data quality, and high penetration depth in dielectric materials while at the same time allowing the operator to move the antenna over the target surface at a high rate of speed.

(2) In particular, Applicant has found that if the ground penetrating radar antenna array is consistently maintained at a spacing of less than or equal to 4 inches above the target surface, the antenna array may be moved up to 75 mph while maintaining accuracy of data collection.

(3) In order to rapidly obtain subsurface measurements using a ground penetrating radar antenna array and associated receiver, Applicant has devised an apparatus designed to particularly maintain the spacing of the distal ends of the ground penetrating radar antenna array at lower than or equal to 4 inches. The system preferably includes a wooden support from which non-elastic NYLON® straps are suspended. The straps at their ends remote from the support are fixedly attached to a housing containing the ground penetrating radar antenna array and receiver.

(4) The housing, supported from above by the straps, is supported from below by a pair of skis that have wear plates attached to their undersides with the wear plates engaging the target surface. The ground penetrating radar array is contained within the housing and the configuration of straps, housing, skis, and wear plates maintain the distal ends of the antennas within the antenna array at a spacing from the target surface of less than 4 inches, preferably 3.75±0.25 inches.

(5) The housing is made of a plastic material and includes therewithin an aluminum bracket, a spacer which supports the antenna array, and foam on the underside and sides, spacing the antenna array from the bottom and side walls of the housing. Dampers are interposed between the housing and the skis to allow the entire system to accommodate to jarring, bumping, and irregularities in the target surface.

(6) Through use of this system, by maintaining the spacing of the distal ends of the antenna array to less than or equal to 4 inches, a vehicle may tow the inventive apparatus at speeds of up to 75 mph while maintaining the ability to accurately sense and record data from the target surface and structures embedded below the target surface.

(7) The housing containing the antenna array provides a physical barrier between the array and roadway hazards such as stray rocks, litter, and other materials that could otherwise cause damage when impacting the antenna array at highway speeds. In the preferred embodiment, the ground penetrating radar consists of a step frequency ground penetrating radar that can provide over 20 antenna channels. These can be scanned in rapid succession at speeds of over 60 mph. This type of radar typically operates in a frequency range of from 200 MHz to 3 GHz.

Accordingly, it is a first object of the present invention to provide an apparatus and method for high speed subsurface inspection of built infrastructure.

It is a further object of such an apparatus and method to provide for those purposes an apparatus including a ground penetrating radar antenna array contained within a housing and suspended from a support using non-stretchable straps.

It is a still further object of the present invention to provide such an invention in which the apparatus is supported from below on skis supporting the housing and interfacing with a target surface via wear plates.

It is a still further object of the present invention to provide such an invention in which the antenna array is maintained at a spacing from the target surface of less than or equal to 4 inches, preferably 3.75±0.25 inches.

It is a still further object of the present invention to contain the antenna array within a housing that facilitates its mounting between straps and skis and also protects the antenna array from impacts from debris and other objects.

These and other objects, aspects and features of the present invention will be better understood from the following detailed description of the preferred embodiment when read in conjunction with the appended drawing figures.

BRIEF DESCRIPTION OF THE DRAWINGS

FIG. 3 shows a side view with details of the associated trailer removed to emphasize details.

FIG. 4 shows a rear view of the inventive device with details of the associated trailer removed to emphasize details.

SPECIFIC DESCRIPTION OF THE PREFERRED EMBODIMENT

Figure 1:
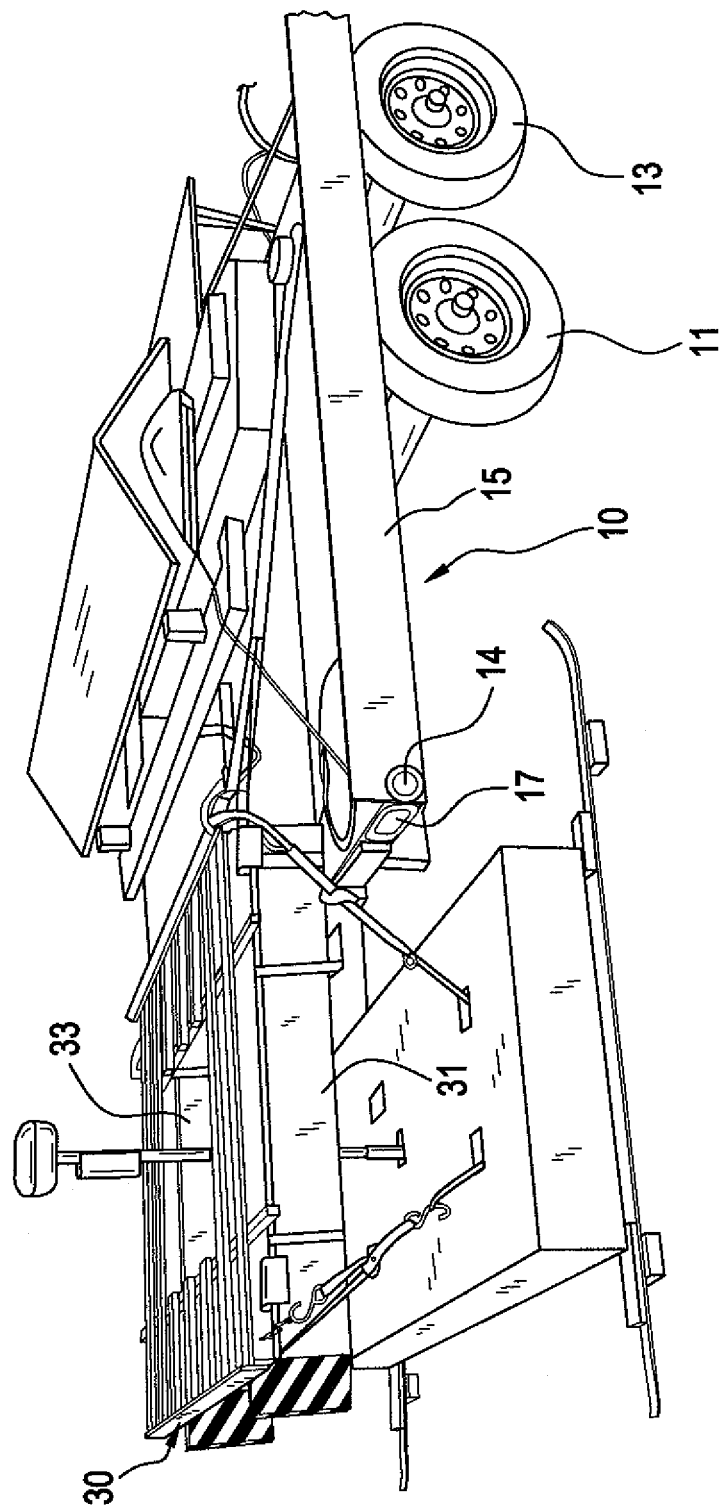
FIG. 1 shows a side perspective view of the inventive device.
Figure 2:
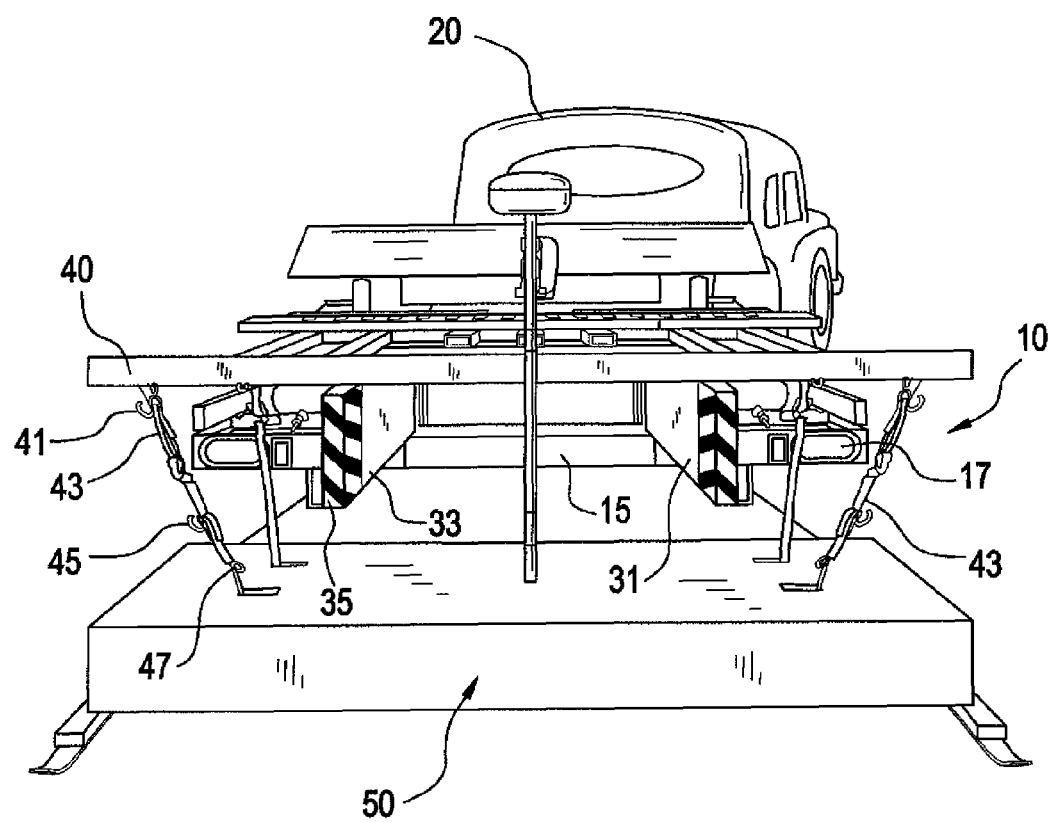
FIG. 2 shows a rear view of the inventive device.

With reference first to FIGS. 1 and 2, a vehicle such as a trailer is generally designated by the reference numeral 10 and is seen to include wheels 11, 13, a frame 15, and lights 17 and reflectors 19. The trailer 10 is hitched to a motorized vehicle 20 (FIG. 2).

Extending rearwardly of the trailer 10 is an upper support structure 30 preferably made of wood beams 31, 33 that have their ends covered with a reflective material 35 for safety purposes. The beams 31, 33 support an aluminum frame 40 that includes downward hanging caribiners at each corner 41 (FIG. 2). To the caribiners are attached four non-stretchable straps 43 preferably made of a non-stretchable material such as NYLON®.

The straps 43 have ends distal from the aluminum frame 40 that carry hooks 45 that couple with rings 47 on the housing 50 suspended below the frame 40.

Figure 5:
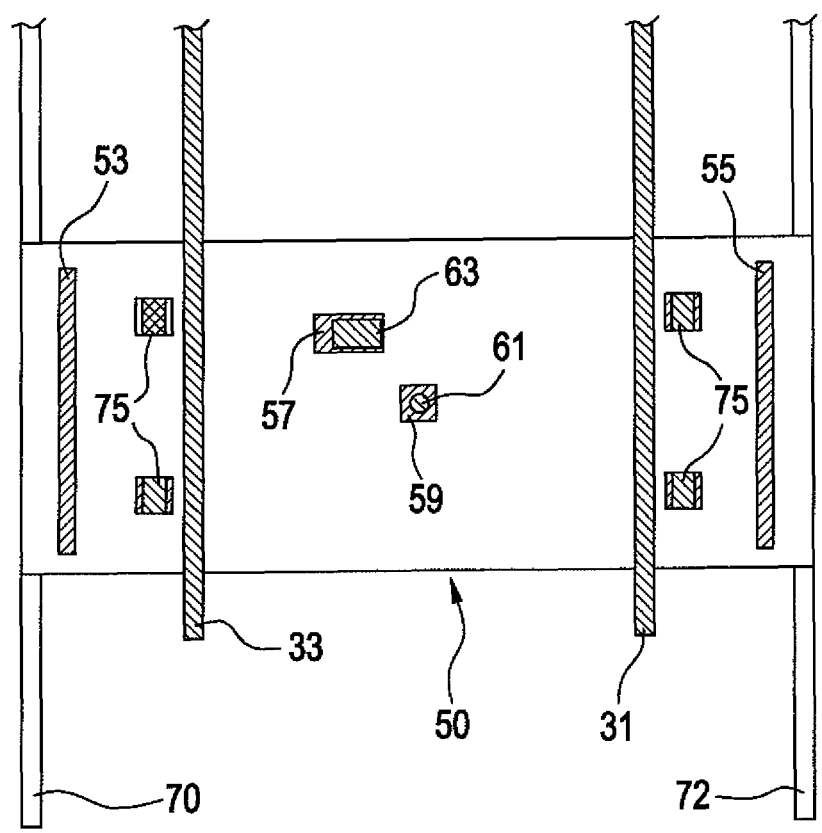
FIG. 5 shows a top view of the inventive apparatus with details of the associated trailer removed to emphasize details.

With reference to FIGS. 3 and 4, the housing 50 is preferably an enclosure made of a material such as acetyl plastic or high density polyethylene (HDPE) plastic. Within the housing 50 an antenna array 51 is contained. With reference to FIG. 5, the antenna array includes antennas 53, 55, 57 and 59. At the location of the antenna 59, a GPS mount point 61 is provided. At the location of the antenna 57 a ground penetrating radar antenna array control box 63 is located.

As seen in the figures, the housing 50 is supported on a pair of skis 70 and 72. Interposed between the housing 50 and the skis 70, 72 are foam or rubber or foam rubber dampers 76 designed to dampen any irregularities in the target surface 73 to smoothen the travel of the inventive device. The skis 70, 72 do not directly engage the target surface 73. Rather, wear plates 78 (FIGS. 3 and 4 in particular) are mounted under the skis 70, 72 and engage the target surface 73. These wear plates must be closely monitored and must be replaced at about four hour intervals (when worn) to ensure proper spacing between the distal ends of the antennas comprising the antenna array 51 and the target surface 73. Preferably, the wear plates are made of bristled brushes with steel brush bristles being preferred.

The brackets 75 (FIGS. 4 and 5), preferably made of aluminum, include attachment points for attachment of the non-stretchable straps 43. For this purpose, the straps 43 extend through small openings in the housing 50 to thereafter be interconnected with the brackets 75.

Within the housing 50, walls are covered with foam 80 and surround the antenna array. The foam helps to cushion the array 51 while doing nothing to impede transmission and reception of microwaves. If desired, a wood spacer may be provided (reference numeral 82) under the top surface of the housing 50 to space the antenna array 51 from the top surface of the housing 50.

With the apparatus having been described as set forth above, it is important to note that the intention is to space the lowermost extent of the antenna array 51, namely, the distal ends of the antennas thereof less than 4 inches from the target surface 73. Ideally, the spacing is 3.75±0.25 inches. Applicant has found that by maintaining this preferred spacing, the antenna array 51 can be operated to send signals into the material under the target surface 73 and receive reflected signals which provide data useful for ascertaining the condition of the infrastructure over which the trailer 10 is traveling. So long as the desired optimal spacing is maintained, the trailer 10 may be driven by the motorized vehicle 20 at speeds of up to 75 mph with no loss of quality of data obtained.

In the preferred embodiment of the present invention, the housing 50 is made of acetyl plastic or HDPE. The beams 31, 33 are made of pressure treated wood. The foam liner 80 is preferably made of molded, expanded polystyrene sheet (MEPS). The dampers 76 are preferably made of extruded, expanded polystyrene (XEPS). The wear plates 78 are preferably made of a consumer product known as HDX brush.

The skis 70, 72 may consist of any commercially manufactured skis such as cross country skis having a length of 190 cm or so. Preferably, the ground penetrating radar antenna array is a commercially available twenty-element array.

As explained above, the antenna array may be, in fact, a step frequency GPR array. Such an array can provide more than 20 antenna channels which can be scanned in rapid succession at speeds of greater than 60 mph. Such an antenna array typically operates at a frequency range of from 200 MHz to 3 GHz. High frequency content is most important for high resolution at shallow depths of less than 1 foot and low frequency content is most important for deep penetration into infrastructure material.

In the method of operating the inventive device, first, the antenna array is mounted in a housing, the housing is suspended from a support and is supported itself on skis that are spaced from an infrastructure surface with wear plates. Dampers are interposed between the skis and the housing to damp any irregularities in the target surface. The assembly is attached to a trailer which is towed by a motorized vehicle. With the system activated, the vehicle may tow the trailer and associated system components at speeds of up to 75 mph without loss of quality of data obtained.

As such, an invention has been disclosed in terms of an apparatus and method thereof which fulfill each and every one of the objects of the invention and provide a new and useful apparatus and method for high speed sub-surface inspection of built infrastructure. The present invention is equally applicable to roadways, bridges, buildings or other infrastructure.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. An apparatus for high speed inspection of built infrastructure, comprising:
   a) an upper support;
   b) a housing containing an array of ground penetrating radar antennas aimed downward;
   c) non-stretchable straps attached between said upper support and said housing;
   d) said housing supported from below on a pair of skis spaced from a target surface by wear plates;
   e) said apparatus supported on a vehicle movable over said target surface to facilitate collection of data concerning structures beneath or behind said target surface.

2. The apparatus of claim 1, wherein said upper support comprises a pair of beams.

3. The apparatus of claim 2, wherein said beams are wooden.

4. The apparatus of claim 1, wherein said straps comprise four straps.

5. The apparatus of claim 1, further including a foam lining within said housing and surrounding said array.

6. The apparatus of claim 1, further wherein distal ends of antennas of said array are spaced from said target surface by a distance of less than or equal to 4 inches.

7. The apparatus of claim 6, wherein said distance is 3.75 ±0.25 inches.

8. The apparatus of claim 1, wherein said housing is spaced from said skis by dampers.

9. The apparatus of claim 8, wherein said dampers are made of a material chosen from the group consisting of foam, rubber and foam rubber.

10. The apparatus of claim 1, wherein said wear plates comprise steel brush bristles.

11. The apparatus of claim 1, wherein said housing has an upper surface made of a plastic chosen from the group consisting of acetyl plastic and high density polyethylene (HDPE) plastic.

12. The apparatus of claim 1, wherein said vehicle comprises a trailer.

13. The apparatus of claim 12, wherein said trailer is hitched to a motorized vehicle, said motorized vehicle towing said trailer at a speed of from 20 miles per hour up to 75miles per hour.

14. A method of conducting subsurface inspections of built infrastructure, including the steps of:
   a) providing an apparatus including:
      i) an upper support;
      ii) a housing containing an array of ground penetrating radar antennas aimed downward;
      iii) non-stretchable straps attached between said upper support and said housing;
      iv) said housing supported from below on a pair of skis spaced from a target surface by wear plates;
      v) said apparatus supported on a vehicle movable over said target surface to facilitate collection of data concerning structures beneath or behind said target surface;
   b) activating said array;
   c) moving said vehicle over said target surface; and
   d) collecting data concerning structures behind or beneath said target surface.

15. The method of claim 14, further including the step of, during said moving step, maintaining distal ends of antennas of said array at a distance of less than or equal to 4 inches from said target surface.

16. The method of claim 15, wherein said distance is 3.75 ±0.25 inches.

17. The method of claim 14, wherein said moving step comprises moving said vehicle at a speed greater than 20 miles per hour and up to 75 miles per hour.

18. The method of claim 14, wherein said vehicle comprises a trailer hitched to a motorized vehicle.

* * * * *